(12) United States Patent  (10) Patent No.: US 6,826,360 B2
Lin et al.  (45) Date of Patent: Nov. 30, 2004

(54) RADIO REMOTE CONTROL SELF-SHUTTER RELEASE CAMERA

(76) Inventors: Erik Lin, PMB #1008, 1867 Ygnacio Valley Rd., Walnut Creek, CA (US) 94598-3214; Kuei-Yun Lu, PMB #1008, 1867 Ygnacio Valley Rd., Walnut Creek, CA (US) 94598-3214

( * ) Notice: Subject to any disclaimer, the term of this patent is extended or adjusted under 35 U.S.C. 154(b) by 0 days.

(21) Appl. No.: 10/364,050

(22) Filed: Feb. 12, 2003

(65) Prior Publication Data

US 2004/0156627 A1 Aug. 12, 2004

(51) Int. Cl.[7] ............................................... G03B 17/00
(52) U.S. Cl. ........................................ 396/56; 396/263
(58) Field of Search ............................ 396/56, 59, 263

(56) References Cited

U.S. PATENT DOCUMENTS 4,051,496 A * 9/1977 Iida et al. ...................... 396/59
5,325,143 A * 6/1994 Kawano ...................... 396/59

* cited by examiner

Primary Examiner—David Gray
Assistant Examiner—Arthur A Smith
(74) Attorney, Agent, or Firm—Leong C. Lei

(57) ABSTRACT

A radio remote control self-shutter release camera having provided on the body of a camera (and/or a video camera) an external radio RC signal input socket connected in parallel with a shutter release button on the camera; the camera being connected to the RC; the RC being provided with an external plug; a separately provided radio RC button to control the shutter release button; the shutter release button circuit being connected in parallel with an input socket without involving any built-in structure or circuit of the camera; the radio RC circuit being separately provided on a remote control device adapted with an external plug to allow the user take the picture of himself simply by pressing a portable RC button.

1 Claim, 4 Drawing Sheets

RADIO REMOTE CONTROL SELF-SHUTTER RELEASE CAMERA

BACKGROUND OF THE INVENTION (a) Field of the Invention

The present invention is related to a radio remote control self-shutter release camera, and more particularly, one that allows its user to take the picture of himself simply by pressing a portable RC button.

(b) Description of the Prior Art

A self-timer is usually provided to a camera, video camera or camcorder jointly to be referred as a camera herein. The self-timer may be of a mechanical or electronic device. To permit its user the sufficient time to leave the camera and get in position for taking his picture. A time delay switch is provided to the self-timer. However, even with the time delay switch, the one who takes the picture has to be very nervous to set the self-timer, rush back to the crowd and make a pose to join the impatient crowd in front of the camera. As a result, the looks of all the people in the picture may be drastically different and the same uncomfortable, and the picture may become distorted or blur, and even a sudden appearance of a stranger.

With the infrared RC technology becoming popular, the camera with a self-timer device adapted with the time delay switch has been gradually replaced with an infrared RC self-shutter release camera. Wherein, several RC circuits are provided to the shutter release control circuit of the camera and connected to an infrared sensor. However, certain electronic devices are required to be added, resulting in more sophisticated electronic circuits and higher risk of failure while the camera becomes larger and heavier to contribute to higher production cost of the camera. Furthermore, application of infrared RC is not necessarily convenient since it is vulnerable to light interference and the relative position of the remote controller.

In recent years, radio RC is provided to the higher price end camera. Essentially, radio RC reception and control circuits are provided inside the camera for radio remote control of the on/off of the shutter release button. However, radio RC eliminates only the problems of being affected by the light interference and position as described above, but it fails to effectively solve the problems related to the complicated built-in structure, larger size, heavier weight and higher production cost.

As the digital camera today is compact, incorporation with the function of a video recorder is the primary objective for the development of the camera. How to provide a remote controller for the shutter release button of the camera is a common interest pursued by both of the digital camera manufacturers and the users.

SUMMARY OF THE INVENTION

The primary purpose of the present invention is to provide a radio RC self-shutter release camera that allows its user to take the picture of himself simply by pressing a portable RC button. To achieve the purpose, the body of the camera (and/or a video camera) is provided with an external radio RC signal input socket connected in parallel with a shutter release button on the camera; the camera being connected to the RC. The RC is adapted with an external plug and a radio RC button is separately provided to control the shutter release button. The shutter release button circuit is connected in parallel with an input socket without involving any built-in structure or circuit of the camera. The radio RC circuit is separately provided on a remote control device adapted with an external plug.

The radio RC self-shutter release camera of the present invention includes a radio RC device, and similar to the camera of the prior art, a main control circuit, a shutter release control circuit and an auto focus circuit, and shutter release control button are provided on the body of the camera. Wherein, the shutter release control circuit and the auto focus circuit are subject to the control by the main control circuit of the camera. A first and a second contacts of the shutter release control button are connected to the main control circuit of the camera. A third and a fourth contacts are respectively connected to the shutter release control circuit and the auto focus circuit. The present invention further contains a radio RC signal input socket on the body of the camera that contains two contacts A and B with Contact A connected to the main control circuit and Contact B to the shutter release control circuit of the camera.

The radio RC device of the present invention contains a radio control transmitter and an external radio RC receiver adapted with an external plug for the external radio RC receiver to plug in the radio RC signal input socket on the camera.

Three contacts are provided to the external radio RC signal socket of the present invention respectively connected to the main control circuit, the shutter release control circuit and the auto focus circuit of the camera.

The present invention provides the following advantages. As a camera, only an external socket is added to the body of the camera that is connected in parallel with the shutter release button to the control circuit without physically affecting the structure of the camera, nor adding the shutter control circuit. The present invention even is capable of simplified the structure of the camera to reduce its failure. Therefore, the present invention does not increase the workload of assembly and service, the size and the production cost of the camera. As for the RC self-shutter release camera and function, the radio RC transmission and reception device is an optional item to the camera since it may not be required depending on the choice of the user. If self-shutter release camera function is required, simply plug it into the external socket of the camera without bothering the complicate function setup. Therefore, the present invention simplifies the internal structure of the camera to prevent it from being vulnerable to damage and allows very easy and convenient use.

DETAILED DESCRIPTION OF THE PREFERRED EMBODIMENTS

It is to be noted first that the same structure of the present invention is applicable to a camera, a video camera or a camera reorder.

Figure 1:
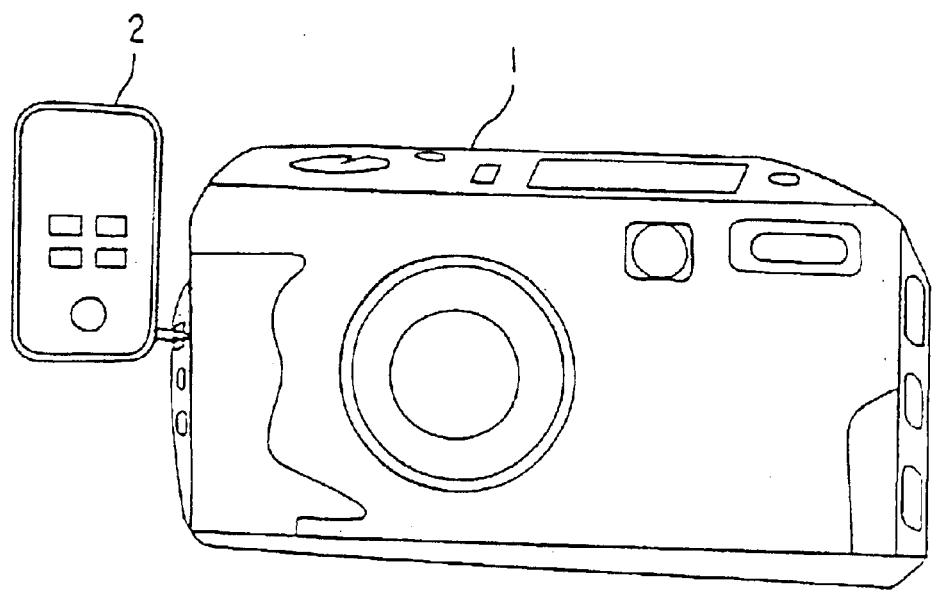
FIG. 1 is a schematic view showing the appearance of a preferred embodiment of the present invention.
Figure 2:
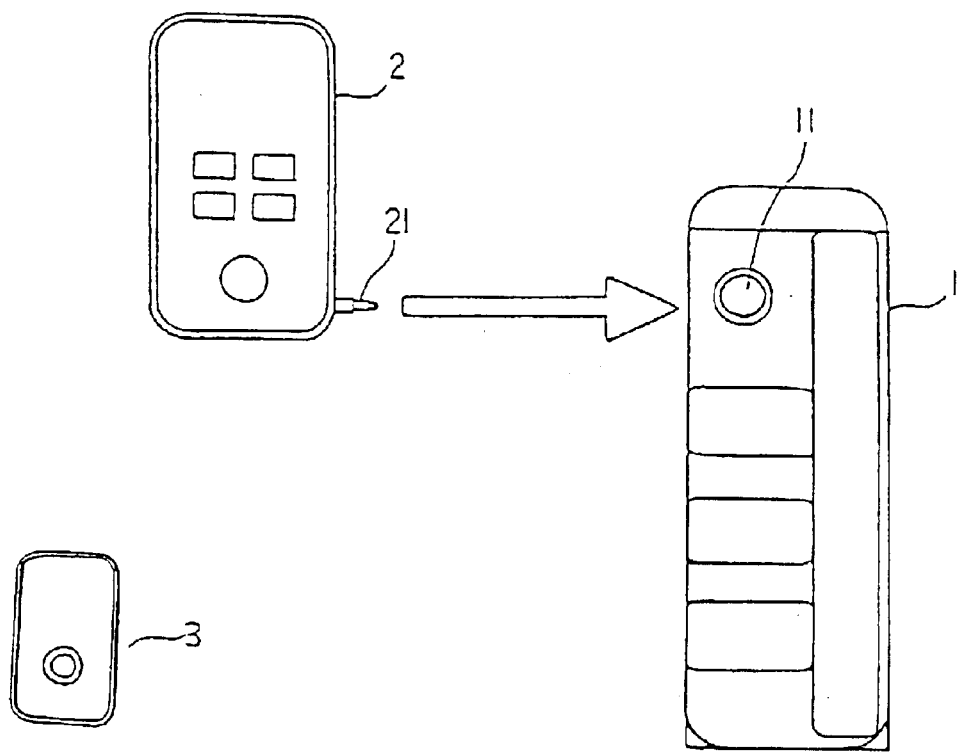
FIG. 2 is a side view of the preferred embodiment of the present invention.

Referring to FIGS. 1 and 2 for a preferred embodiment of the present invention, an external socket 11 is provided at where appropriately on the body of a camera 1, and an external radio RC receiver 2 is plugged with its external plug 21 into the external socket 11.

Figure 3:
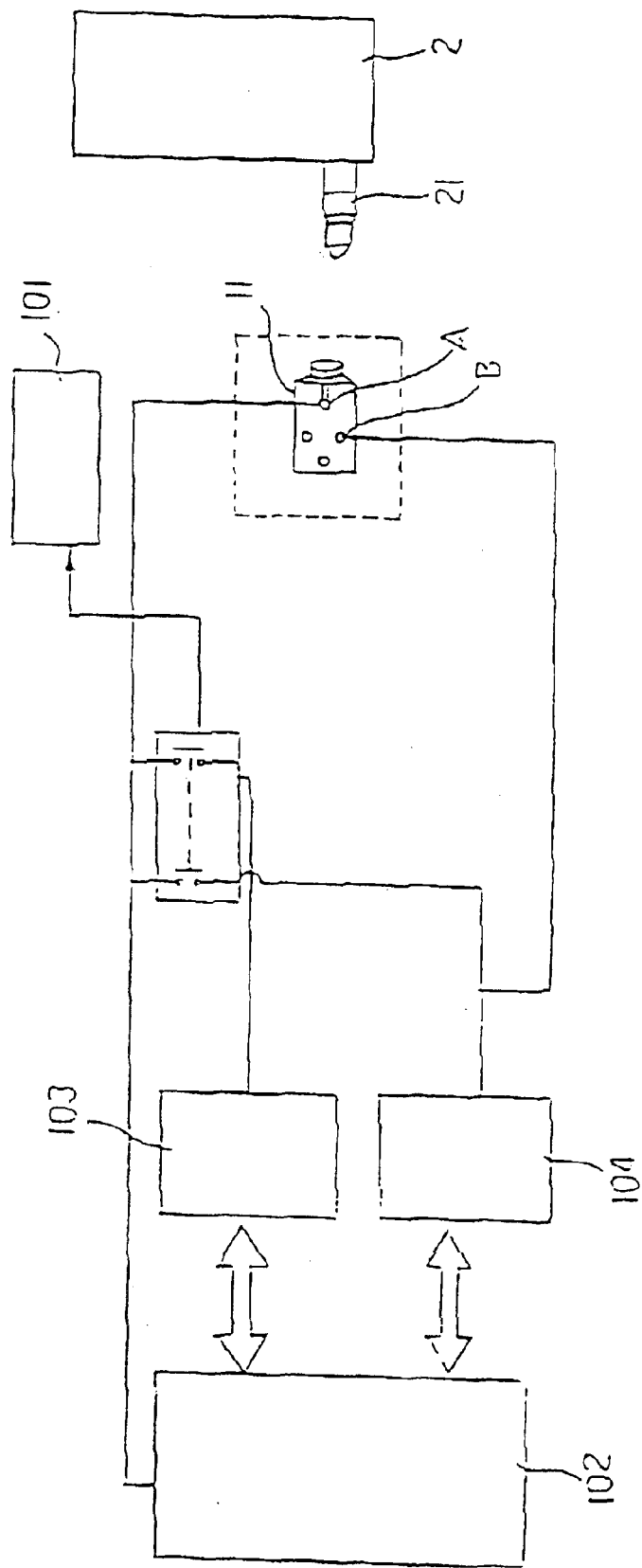
FIG. 3 is a block chart showing a shutter release control circuit of the preferred embodiment of the present invention.
Figure 4:
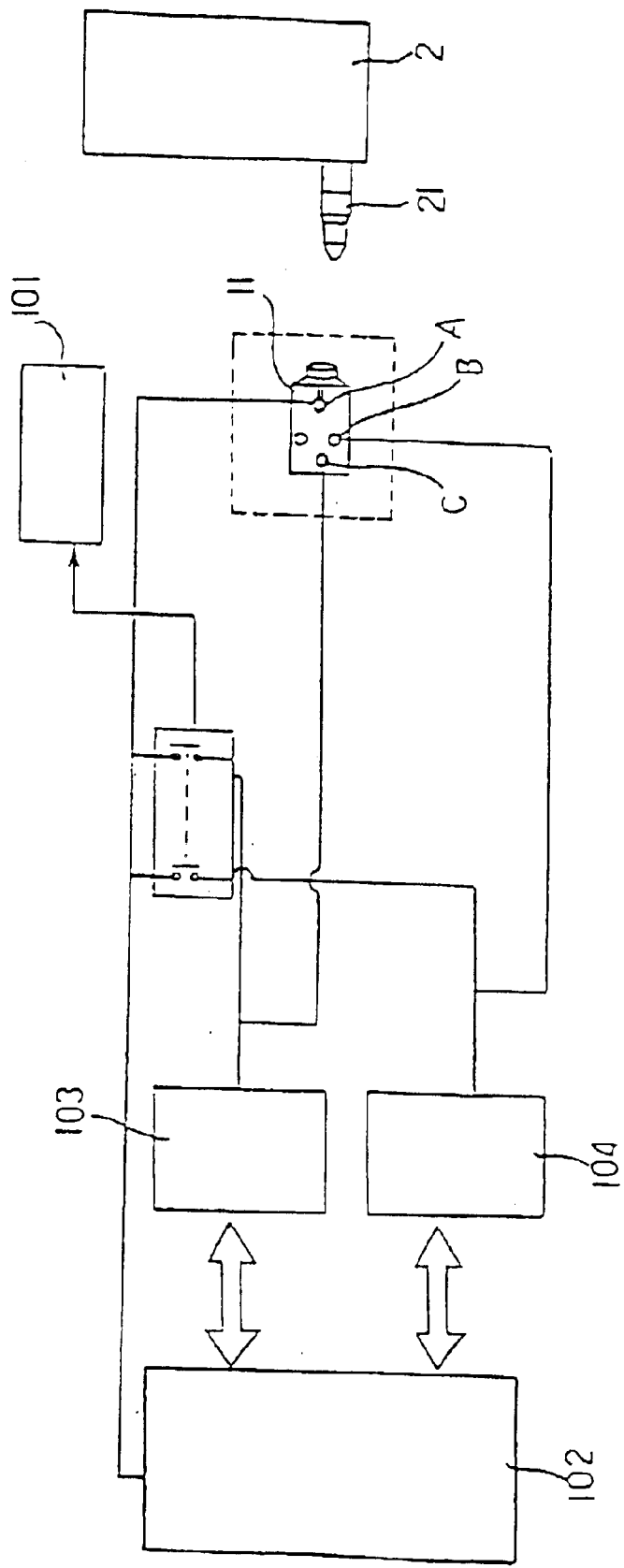
FIG. 4 is a block chart showing a shutter release control circuit of another preferred embodiment of the present invention.

FIGS. 3 and 4 show two preferred embodiments of an RC self-shutter release control circuit of the present invention. In FIG. 3, an auto self-shutter release circuit of the first preferred embodiment includes a camera main circuit 102, a shutter release control circuit 104, an auto focus circuit 103 and a shutter release control button 101 is provided to the camera body 1. Wherein, both of the shutter release control circuit 104 and the auto focus circuit 103 are subject to the control by the main control circuit 102. A first and a second contacts from the shutter release control circuit 101 are connected to the main control circuit 102; and a third and a fourth contacts are respectively connected to the shutter release control circuit 104 and the auto focus control circuit 103. In the first preferred embodiment, the external radio RC signal input socket 11 on the camera body 1 is provided with two contacts A and B with Contact A being connected to the main control circuit 102 and Contact B being connect to the shutter release control circuit.

The second preferred embodiment as illustrated in FIG. 4 is basically similar to that as shown in FIG. 3 provided, however, that three contact points A, B, and C are provided to the external radio RC signal input socket 11 on the camera body 1 that are respectively connected in sequence to the main control circuit 102, the shutter release control circuit 104 and the auto focus circuit 103.

The present invention is also adaptable to a general camera or a digital camera provided with a socket of multiple contacts as long as two or more than two of those contacts are connected to the control circuit of the auto shutter release control circuit and an external plug of the respective radio RC receiver is provided.

Figure 5:
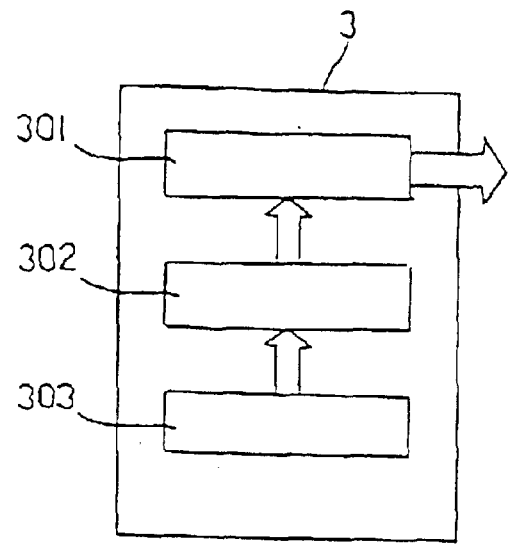
FIG. 5 is a block chart showing a control circuit of a radio remote control transmitter of the present invention.
Figure 6:
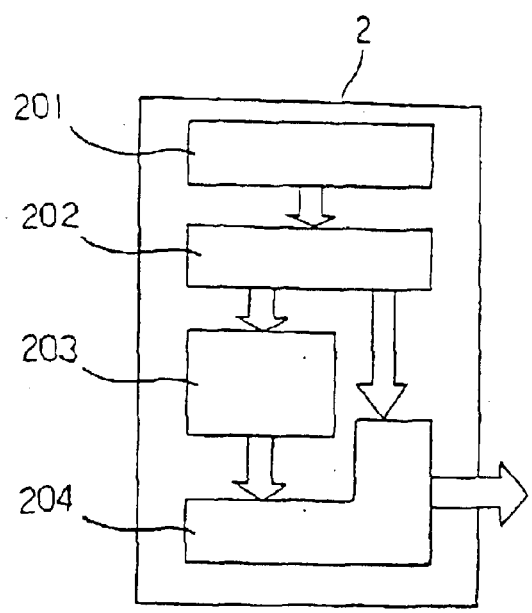
FIG. 6 is a block chart showing a control circuit of a radio remote control receiver of the present invention.

FIGS. 5 and 6 are block charts of the present invention adapted with the radio RC device. Wherein, the radio RC device relates to one that is generally used in the prior art. Referring to the control circuit block chart of a radio RC transmitter in FIG. 5, the transmitter 3 includes a push-button switch 303, a transmission circuit 302 and a decoding output circuit 301. In the control circuit block chart of a radio RC receiver as illustrated in FIG. 6, the receiver 2 includes a radio reception circuit 201, a decoding circuit 202, a time sequence control circuit 203 and an output control circuit 204. An external plug 21 from the receiver 2 and an output control circuit 204 are interconnected to each other and fixed to the casing of the receiver 2 as illustrated in FIG. 2.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. A radio remote control self-shutter release camera comprising:

a body;

an input socket mounted on said body;

an external radio RC receiver having an external plug adapted to be connected with said input socket;

a radio remote control device, said radio remote control device comprising a camera main circuit, a shutter release control circuit, an auto focus circuit, and a shutter release control button, said shutter release control circuit and said auto focus circuit being subject to control by said camera main circuit, said shutter release control button having a first and a second contacts connected to said camera main circuit and a third and a fourth contacts being respectively connected to said shutter release control circuit and said auto focus control circuit, said radio remote control device containing a radio remote control transmitter;

said input socket provided with two contacts, with one contact being connected to said main control circuit of said self-shutter release camera and another contact B being connected to the shutter release control circuit.

* * * * *